United States Patent [19]
Kawanaka et al.

[11] Patent Number: 5,546,479
[45] Date of Patent: Aug. 13, 1996

[54] METHOD FOR DETECTING INCLINATION OF AN IMAGE OF CHARACTERS

[75] Inventors: Seido Kawanaka; Mituo Yoshikawa; Hiroyoshi Naito, all of Osaka, Japan

[73] Assignees: Sharp Corporation, Osaka; Ezel Inc., Tokyo, both of Japan

[21] Appl. No.: 535,322

[22] Filed: Sep. 27, 1995

Related U.S. Application Data

[63] Continuation of Ser. No. 391,476, Feb. 21, 1995, abandoned, which is a continuation of Ser. No. 913,460, Jul. 15, 1992, abandoned.

[30] Foreign Application Priority Data

| Jul. 16, 1991 | [JP] | Japan | 3-201244 |
| Jul. 16, 1991 | [JP] | Japan | 3-201247 |
| Jul. 16, 1991 | [JP] | Japan | 3-201268 |
| Aug. 6, 1991 | [JP] | Japan | 3-220931 |

[51] Int. Cl.$^6$ ................................ G06K 9/32
[52] U.S. Cl. .................. 382/290; 382/296; 382/256
[58] Field of Search ................ 382/176, 256, 382/257, 258, 286, 289, 290, 296

[56] References Cited

U.S. PATENT DOCUMENTS

| 4,558,461 | 12/1985 | Schlang | 382/46 |
| 4,866,784 | 9/1989 | Barski | 382/46 |
| 5,093,653 | 3/1992 | Ikehira | 382/46 |
| 5,191,438 | 3/1993 | Katsurada | 382/46 |

FOREIGN PATENT DOCUMENTS

| 431496 | 6/1991 | European Pat. Off. | G06K 9/32 |
| 431962 | 1/1993 | European Pat. Off. | G06K 9/32 |

OTHER PUBLICATIONS

Srihari S N et al., "Eighth Internat, Copnf. on Pattern Recognition Proceedings", France, Oct. 27–31, 1986 pp. 434–436.

Nakamura O et al "A Chara, segmentation alogorithm for mixed mode communication ", Jul.–Aug. 1985.

*Primary Examiner*—Leo Boudreau
*Assistant Examiner*—David R. Anderson
*Attorney, Agent, or Firm*—Cushman, Darby & Cushman

[57] ABSTRACT

A method of determining unintended inclination in an image of characters that is to be processed by a device such as a copy machine, a facsimile machine, or an optical character recognition system. An image of characters is generated, and expansion is performed on this image the optimal number of times. The number of expansions is based on the differences in the area of the non-background portion of the image at various stages of expansion. Next, the major direction of inclination is determined for the image. The inclination angle of the image is then determined based on the inclination factors of the character lines for various zones in the image.

24 Claims, 10 Drawing Sheets

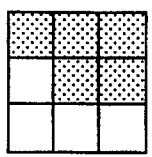 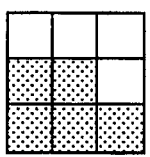 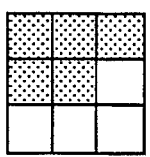 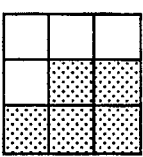 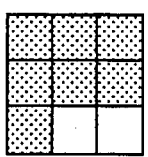 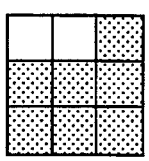
Fig. 2(A)  Fig. 2(B)  Fig. 2(C)  Fig. 2(D)  Fig. 2(E)  Fig. 2(F)
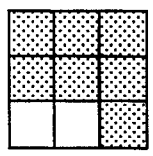 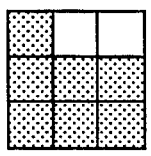 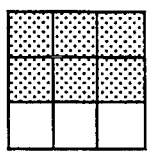 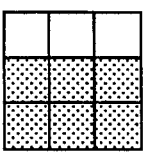 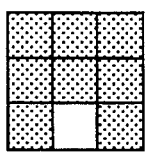 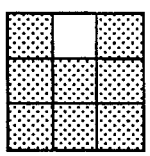
Fig. 2(G)  Fig. 2(H)  Fig. 2(I)  Fig. 2(J)  Fig. 2(K)  Fig. 2(L)
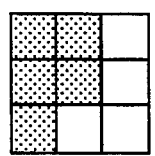 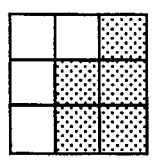 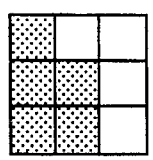 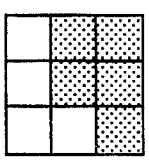 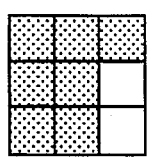 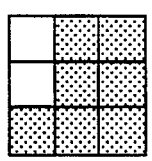
Fig. 3(A)  Fig. 3(B)  Fig. 3(C)  Fig. 3(D)  Fig. 3(E)  Fig. 3(F)
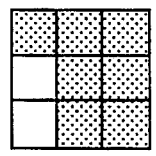 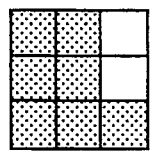 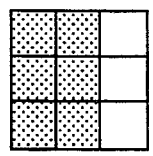 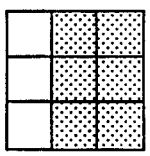 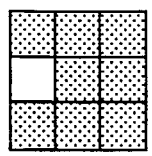 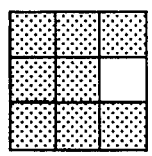
Fig. 3(G)  Fig. 3(H)  Fig. 3(I)  Fig. 3(J)  Fig. 3(K)  Fig. 3(L)

TO FIG. 6(B)

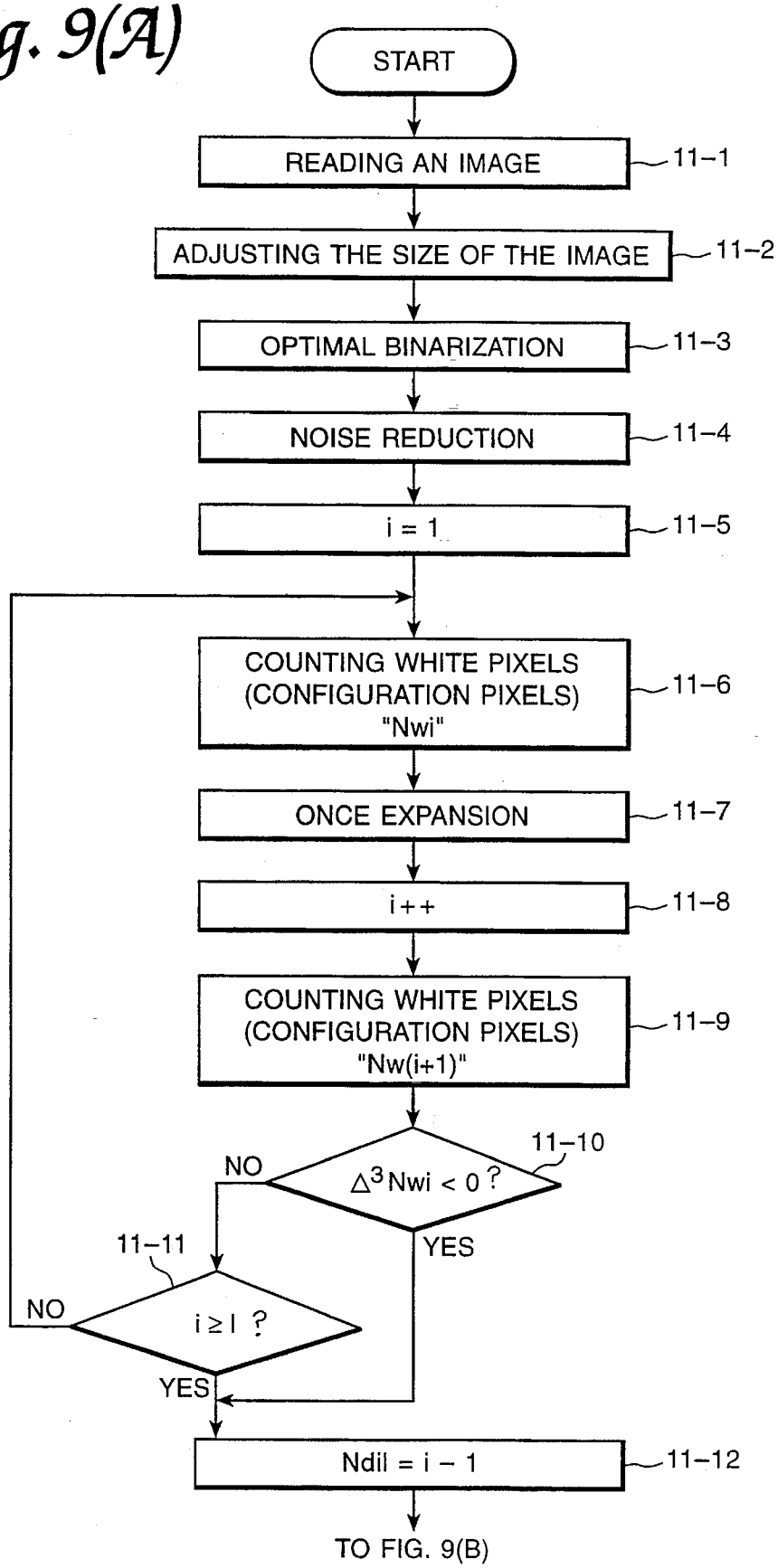

METHOD FOR DETECTING INCLINATION OF AN IMAGE OF CHARACTERS

This is a continuation of application Ser. No. 08/391,476, filed on Feb. 21, 1995, which was abandoned upon the filing hereof which was a continuation of application Ser. No. 07/913,460, filed Jul. 15, 1992, now abandoned.

BACKGROUND OF THE INVENTION

1. Field of the Invention

The present invention relates to a method for detecting inclination of an image of characters that is being read, especially to a method for detecting inclination so as to correct non intended inclination of a paper that is to be input and read as an image by a device such as a copy machine, facsimile machine, or optical character recognition system.

2. Description of the Related Art

When a paper that is to be input inclines relative to the input device, the character lines printed on the paper also incline. When such a paper is input in an inclined condition to a facsimile machine or to an optical character recognition system, the data compression ratio and recognition ratio are lowered. For copy machines, it is necessary to correct the inclination of a paper to be copied automatically in order to stabilize the quality of the copy.

The conventional method for recognizing inclination uses the techniques of expansion, shrinking and thinning (Nakamura, et al., "Algorithm to Extracting Character Area for Mixed-Mode Communication", The Transactions of the Institute of Electronics, Information and Communication Engineers, Vol. J67-D, No. 11, pp. 1277–284, November, 1984). According to this method, after binarizing the characters on the paper that is to be input and read, the neighboring characters are connected by expansion. Next, the row of connected characters are formed into rather thin lines by shrinking the image, filling the holes and thinning the image. Any uneven parts on the ends of the thinned image are made smooth by shrinking. In such a thinned image, the inclination of the group with a predetermined length is calculated after the items have been labeled. This inclination is regarded as the inclination of the paper to be input.

When using this known method, the number of times which expansion must be performed is determined by experience. In order to obtain the optimal number of expansions, characteristics of the paper to be input such as the size, quality, and material must be considered by eye.

SUMMARY OF THE INVENTION

The object of the present invention is to solve the above-stated problem with the prior art method by providing a method for detecting the inclination of an image of characters to be read after performing the optimal number of expansions.

According to the present invention, an image to be read is repeatedly expanded and the differently expanded images are compared. The expansion process is determined to be finished when the difference in area between differently expanded images is less than a predetermined value. The image that was created by the expansion immediately previous to the last expansion is used for calculating inclination of character lines. The inclination of the character lines is calculated from the expanded image or an image obtained from thinning the expanded image.

BRIEF DESCRIPTION OF THE DRAWINGS

FIGS. 2(A)–2(L) shows different pixel patterns which are classified as having different degrees of horizontal inclination.

FIGS. 3(A)–3(L) show different pixel patterns which are classified as having different degrees of vertical inclination.

FIGS. 9(A)–9(B) show a flow-chart of a third embodiment of the method of the present invention.

DESCRIPTION OF THE PREFERRED EMBODIMENTS

Figure 1A:
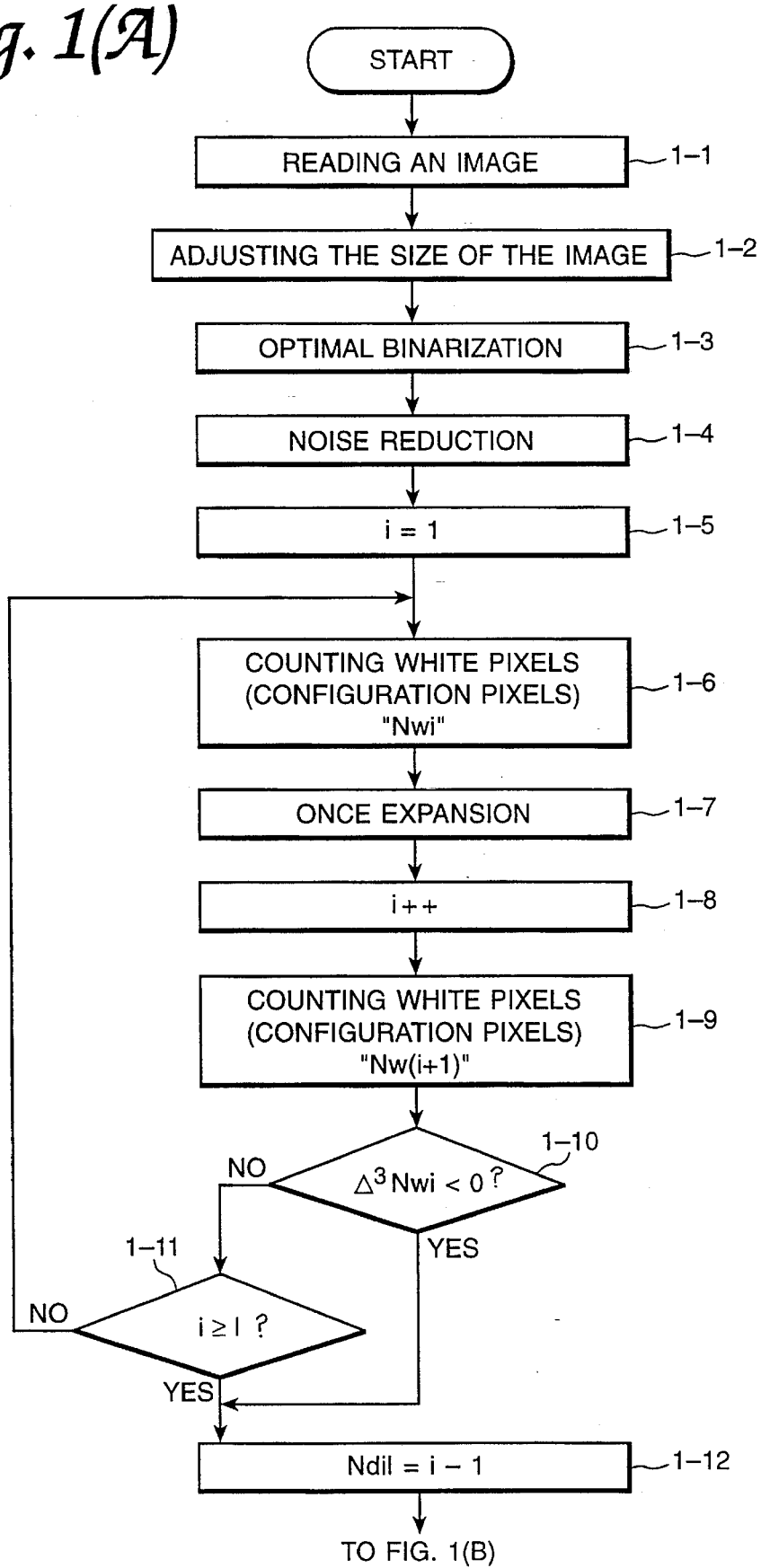
FIGS. 1(A)–1(B) show a flow-chart of an embodiment of the method of the present invention.
Figure 1B:
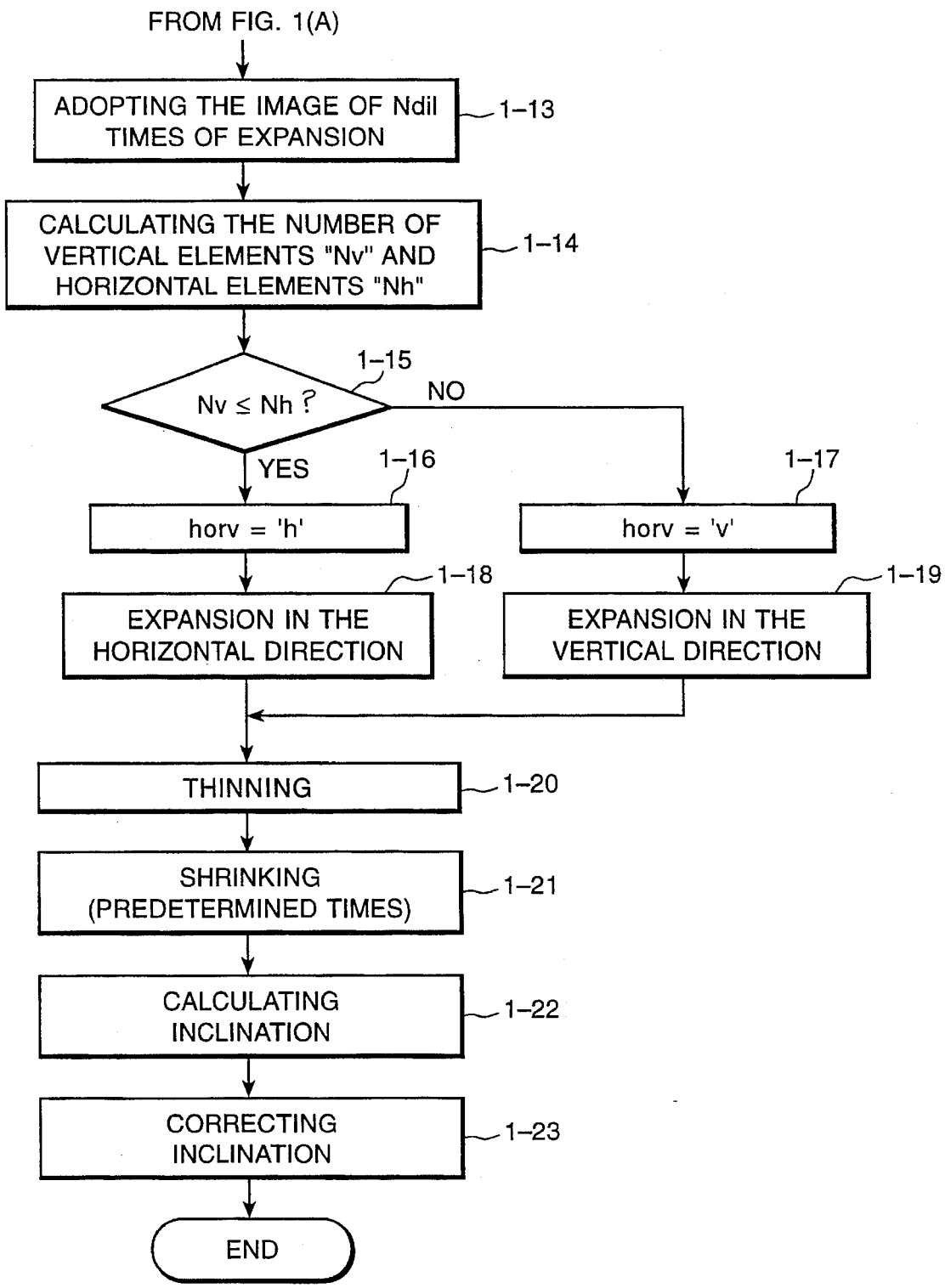
Figure 4A:
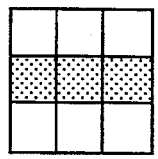
FIGS. 4(A)–4(I) show different pixel patterns which are classified as having different degrees of horizontal inclination.
Figure 4B:
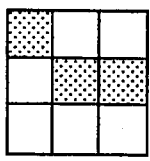
Figure 4C:
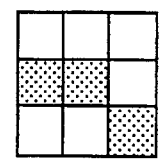
Figure 4D:
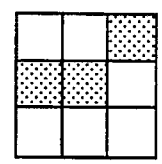
Figure 4E:
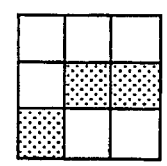
Figure 4F:
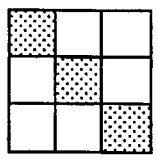
Figure 4G:
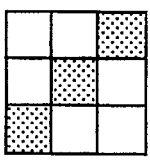
Figure 4H:
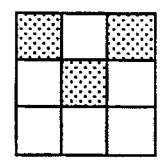
Figure 4I:
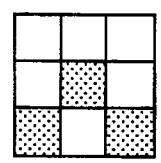
Figure 5A:
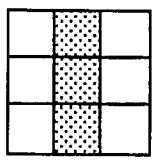
FIGS. 5(A)–5(I) show different pixel patterns which are classified as having different degrees of vertical inclination.
Figure 5B:
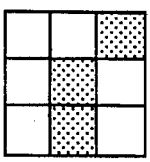
Figure 5C:
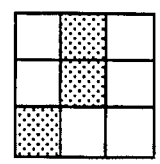
Figure 5D:
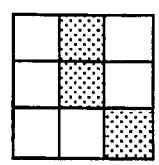
Figure 5E:
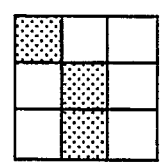
Figure 5F:
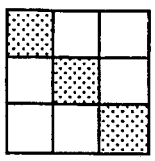
Figure 5G:
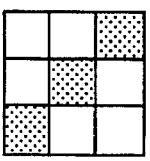
Figure 5H:
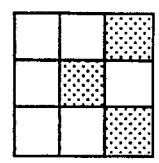
Figure 5I:
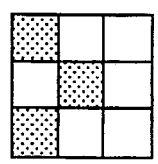

Hereinafter, an embodiment of the method for detecting the inclination of an image of characters of the present invention is described with reference to the attached drawings.

FIGS. 1(A)–1(D) show a flow-chart of one embodiment of the present invention. First, a paper upon which characters are printed is read by the input portion of a device such as an optical character recognition system in step 1—1. The frame size of the image is then adjusted in step 1-2. For example, when the output image of a scanner has 4096× 4096 pixels but the image processor only processes an image containing 1024×1024 pixels, it is necessary,to scale-down the input image by a factor of ¼. On making the scale-down, the gray level information for the original image can be stored using the mean value of each block of pixels in the original image as the value of the corresponding pixel in the scaled down image. Thus, where the scale down is by ¼, each pixel in the scaled down image will be given the mean gray level value of the 4 pixel×4 pixel area in the original image to which it corresponds.

Next, after calculating the histogram of the density of the image, the image is binarized using the optimal threshold in step 1-3, and noise is reduced in step 1-4. The optimal threshold for binarization can be calculated efficiently by using one of the known methods such as the mode method, the discrimination analysis method, the p-tile method, or regarding the center value of the density as the optimal threshold. Noise reduction can be accomplished efficiently by using a known method such as a median filter or reduction of an isolated point.

The inclination of the lines of characters can be easily found by first converting each line into a figure of a rectangle after performing expansion the optimal numbers of times in the direction of the major direction of inclination of the paper to be input (e.g., if the characters are written in the horizontal direction, then the image is expanded in the horizontal direction). Next, the rectangles are thinned. The inclination of the thinned figures can then be determined.

The determination of optimal number of expansions, which shall hereinafter be referred to as Ndil, is described as follows with reference to steps 1–5 through 1–13.

In step 1–5, the loop counter i for counting the number of expansions is initialized in order to perform expansion repeatedly. In step 1–6, the number of non-background pixels Nw(i) (shown as white pixels in the pixel patterns of FIGS. 2(A)–3(L)) after noise reduction is counted and the value of the number of non-background pixels is determined.

Every time expansion is performed in step 1–7, the following steps 1–8 through 1–10 are also performed. In step 1–8 loop counter i is increased. The number of non-background pixels Nw(i+1) is counted in step 1–9, and the cubic differential between the number of non-background pixels for successive expansions is calculated according to the following formula:

$$\Delta^3 Nw(i) = \Delta^2 Nw(i+1) - \Delta^2 Nw(i)$$

where, $$\Delta^2 Nw(i) = \Delta Nw(i+1) - \Delta Nw(i)$$

$$\Delta Nw(i) = Nw(i+1) - Nw(i)$$

If the result of $\Delta^3 Nw(i)$ is found in step 1–10 to be negative, the lines are already merged together and, consequently, the optimal number of times of expansion is adopted in step 1–13 as Ndil =i−1. The image that was expanded i−1 times will be used for finding the major direction of inclination in step 1–14.

If it is unclear when the lines begin to merge because of noise which could not be reduced, then a predetermined value 1 is used as the maximal limit on the number of expansions i. In such a case, the expansion is terminated even when the cubic differential does not go to a negative value in step 1–11.

The major direction of inclination of the paper is found in step 1–14. That is, in step 1–14 it is determined whether the characters are written in the horizontal direction or in the vertical direction. This determination is made by totaling each inclination element in the image.

The patterns shown in FIGS. 2(A)–2(L) are regarded as horizontal inclination elements and the patterns shown in FIGS. 3(A)–3(L) are regarded as vertical inclination elements. The major direction of inclination in the image is recognized based on the quantative appearance of these patterns.

The inclination for each of the patterns shown in FIGS. 2(A)–3(L) is defined by the lines of the background pixels (shown in white) in the pattern. Patterns with only one background pixel around the processing area (FIGS. 2(K)–2(L) and 3(K)–3(L)), are regarded as a vertical pattern when the background pixel is on the right or left of the processing are, and as a horizontal pattern when it is on the top or bottom of the processing area. A diagonal pattern of 45° is not classified as being horizontal or vertical.

Defining the number of patterns found in the image that are in the vertical direction as "Nv" and that are in the horizontal direction as "Nh" the image is recognized to have its major direction of inclination in the horizontal direction when Nv≦Nh. In all other cases the image is recognized to be in the vertical direction. The major direction of inclination is indicated in step 1–15 through 1–17.

The image is then expanded according to the predetermined optimal number of times in the direction of the major direction of inclination in step 1–18 or 1–19 and the characters on each line are merged. Expansion should be performed the minimal number of times required for the characters to be merged. An example of the number of times expansion should be performed is ¾ Ndil.

Each line in the image after expansion is roughly a rectangle, which are thinned in step 1–20. Through thinning, the rectangles are pared down to a width of one pixel by sequentially deleting the outermost pixels on the figure so as to reduce it by one pixel width at a time. Effective methods for thinning are the Hildich method and the method disclosed in Japanese Patent Publication Number 64-13680. It is possible to obtain the thinned line at the center or near the center of the rough rectangle and, consequently, effective elements can be obtained for calculating the inclination of the lines of characters.

In some cases, the end of the thinned lines contain branches or curves because of noise or because of the shape on the end of the rectangle. Such improper parts prevent precise calculation. In order to reduce the improper parts, in step 1–21 the end points of the thinned lines are shrunk. Shrinking reduces the improper parts on both ends and allows for the precise determination of the inclination. The inclination will then be calculated in step 1–22.

The number of times shrinking is performed should be the minimum. The optimal number of shrinkings has been found to be $15/4 \times Ndil+1$, where Ndil is calculated as described above. When the lines are shrunk this many times, a length corresponding to about 1 to 1½ characters will be deleted.

To calculate the inclination of a paper with the major direction of inclination in the horizontal direction, the number of times that each of the patterns shown in FIGS. 4(A)–4(I) are found in the image is determined. These values are then multiplied by the corresponding factors and the results are summed.

The following chart shows the pixel patterns which are classified as horizontal, along with the corresponding factors and the reference number of the accompanying figure which shows the pattern.

| Pixel Pattern With Reference to Center | Factors | FIGURE showing |
|---|---|---|
| 1 pixel on left, 1 pixel on right | 0 | 4(A) |
| 1 pixel on upper left, 1 pixel on right | 0.5 | 4(B) |
| 1 pixel on left, 1 pixel on lower right | 0.5 | 4(C) |
| 1 pixel on left, 1 pixel on upper right | −0.5 | 4(D) |
| 1 pixel on lower left, 1 pixel on right | −0.5 | 4(E) |
| 1 pixel on upper left, 1 pixel on lower right | 1 | 4(F) |
| 1 pixel on lower left, 1 pixel on upper right | −1 | 4(G) |
| 1 pixel on upper left, 1 pixel on right | 0 | 4(H) |
| 1 pixel on lower left, 1 pixel on lower right | 0 | 4(I) |

The factors for each pattern are derived based on the relative location of the non-background pixels to the center. Patterns with two diagonal lines are given the absolute value 1.

Where the total number of occurrences of each pattern shown in FIGS. 4(A)–4(I) which are found in the image are defined as "Na" to "Ni", respectively, then the inclined angle θ can be calculated by the formula below.

$\theta=\tan^{-1}[\{0.5(Nb+Nc)-0.5(Nd+Ne)+Nf-Ng\}/(Na+Nb+Nc+Nd+Ne+Nf+Ng+Nh+Ni)]$ A paper to be input which has its major direction of inclination in the vertical direction can be processed in a similar way. The vertical patterns corresponding to the patterns shown in FIGS. 4(A) to 4(I) are shown as FIGS. 5(A) to 5(I).

The following chart shows the pixel patterns which are classified as vertical, along with the corresponding factors and Figure numbers.

| Pixel Pattern With Reference to Center Pixel | Factors | FIGURE Showing |
|---|---|---|
| 1 pixel above, 1 pixel below | 0 | 5(A) |
| 1 pixel on upper right, 1 pixel below | 0.5 | 5(B) |
| 1 pixel above, 1 pixel on lower left | 0.5 | 5(C) |
| 1 pixel above, 1 pixel on lower right | −0.5 | 5(D) |
| 1 pixel on upper left, 1 pixel below | −0.5 | 5(E) |
| 1 pixel on upper left, 1 pixel on lower right | −1 | 5(F) |
| 1 pixel on lower left, 1 pixel on upper right | 1 | 5(G) |
| 1 pixel on upper right, 1 pixel on lower right | 0 | 5(H) |
| 1 pixel on upper left, 1 pixel on lower left | 0 | 5(I) |

Using the method described above, it is possible to calculate the inclination easily and precisely. Thereafter, in step 1-23 the image can be rotated so as to be aligned to the horizontal or vertical line of the input device. Such rotation can be performed through Affine transformation by a special purpose IC known as an Affine transformation IC.

Hereinafter, the second embodiment of the method for detecting inclination of an image of a paper to be input of the present invention is described.

Figure 6A:
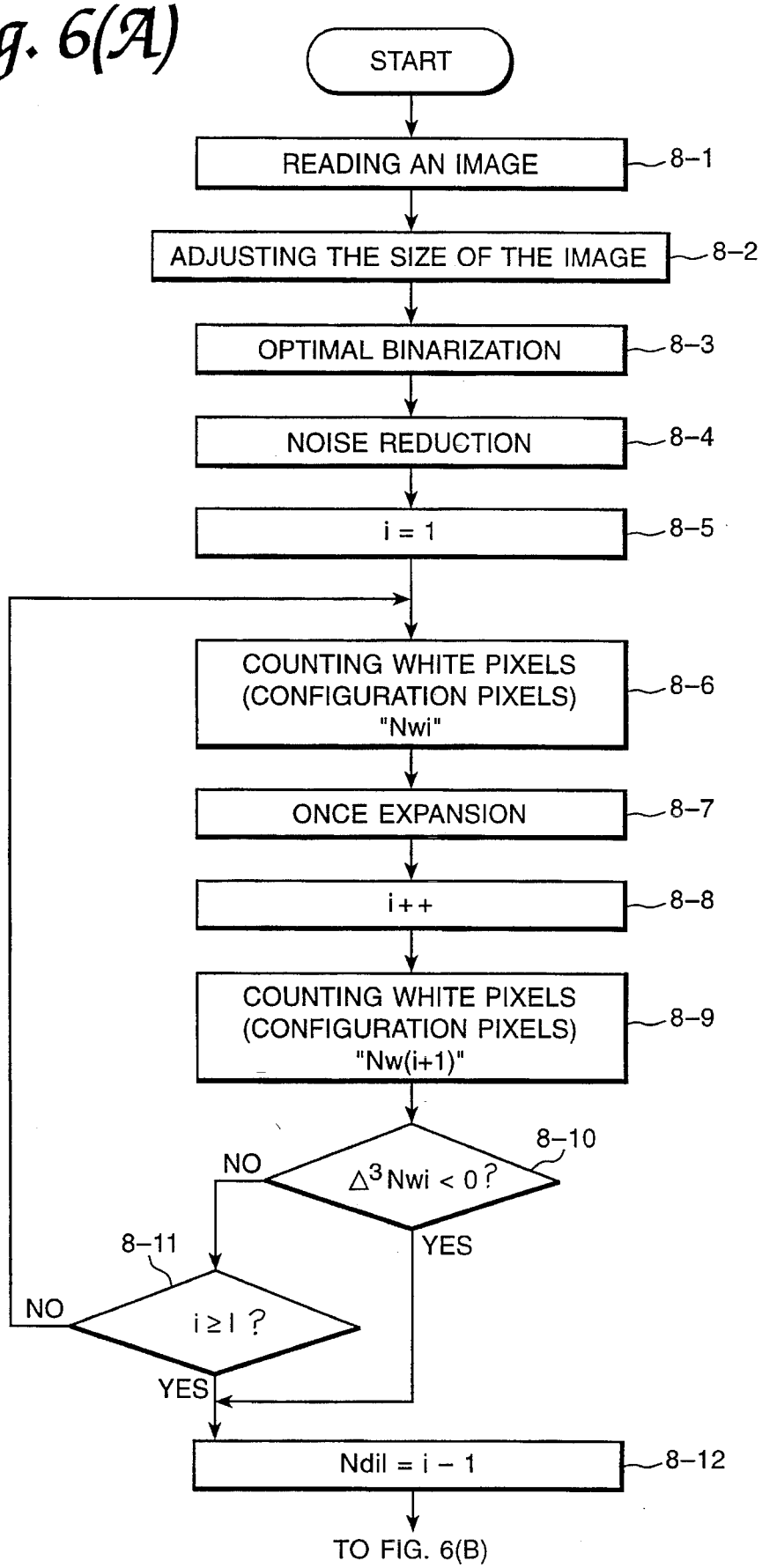
FIGS. 6(A)–6(B) show a flow-chart of a second embodiment of the method of the present invention.
Figure 6B:
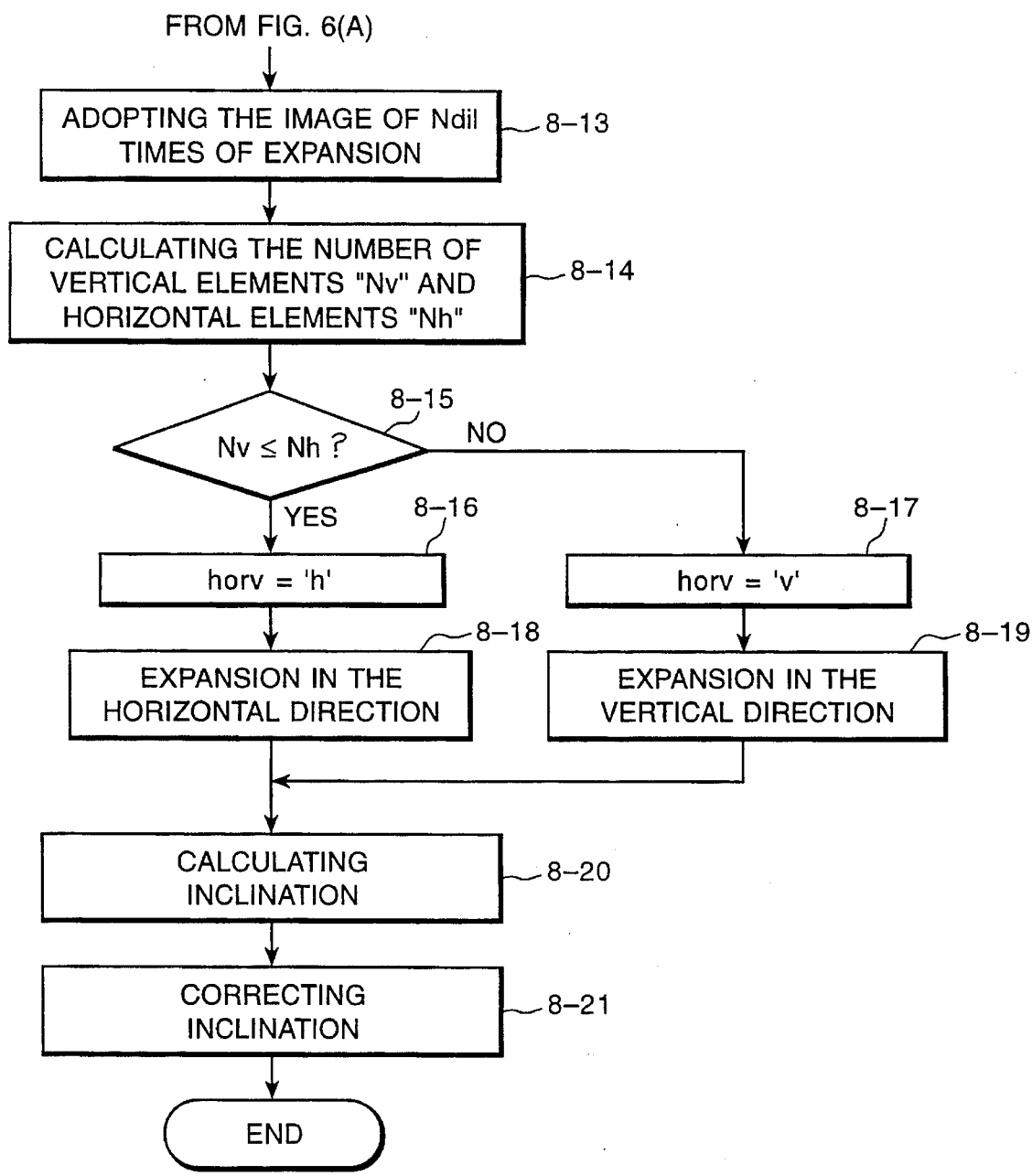

FIGS. 6(A)–6(B) show a flow-chart of the second embodiment of the present invention. In this embodiment, process steps from 8-1 to 8-19 are equivalent to those shown in FIGS. 1(A)–1(B) and described above. However, in this embodiment, the steps of thinning and shrinking the image are not performed. Rather, the inclination is calculated in steps 8-20 using the image that was expanded in steps 8-18 or 8-19. The process is therefore easier and faster.

Figure 7A:
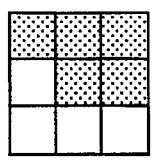
FIGS. 7(A)–7(P) show different pixel patterns which are classified as having different degrees of horizontal inclination.
Figure 7B:
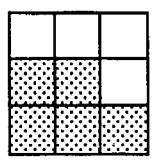
Figure 7C:
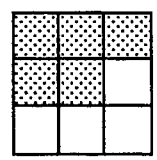
Figure 7D:
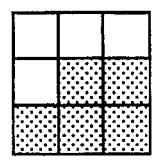
Figure 7E:
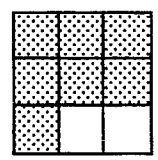
Figure 7F:
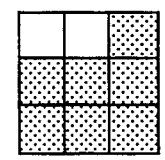
Figure 7G:
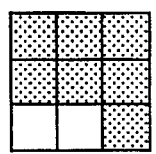
Figure 7H:
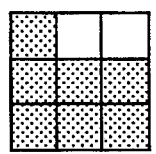
Figure 7I:
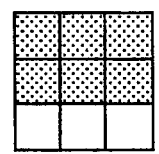
Figure 7J:
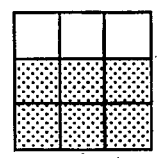
Figure 7K:
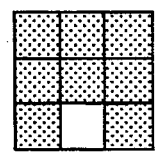
Figure 7L:
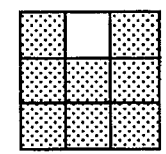
Figure 7M:
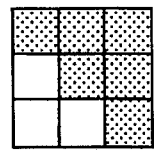
Figure 7N:
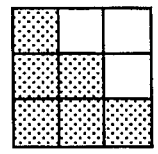
Figure 7O:
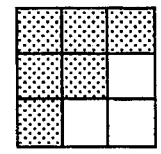
Figure 7P:
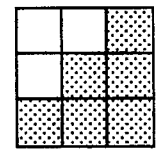
Figure 8A:
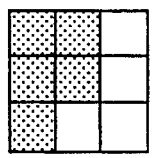
FIGS. 8(A)–8(P) show different pixel patterns which are classified as having different degrees of vertical inclination.
Figure 8B:
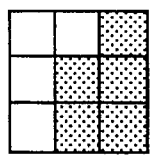
Figure 8C:
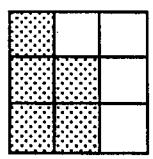
Figure 8D:
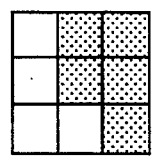
Figure 8E:
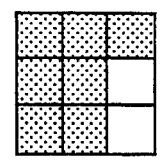
Figure 8F:
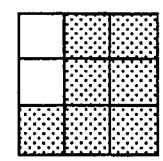
Figure 8G:
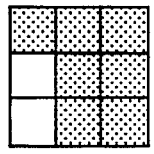
Figure 8H:
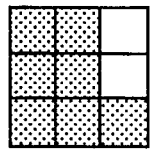
Figure 8I:
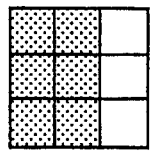
Figure 8J:
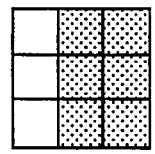
Figure 8K:
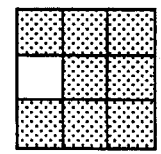
Figure 8L:
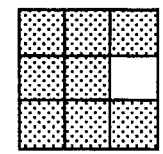
Figure 8M:
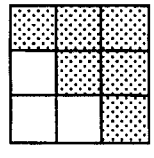
Figure 8N:
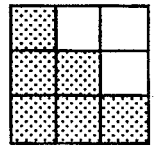
Figure 8O:
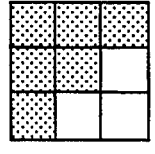
Figure 8P:
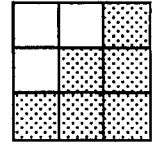

In order to calculate the inclination of a paper with the major direction of inclination in the horizontal direction, the number of times that each of the patterns shown in FIGS. 7(A)–7(P) are found in the image is determined. These values are then multiplied by the corresponding factors and the results are summed.

The following chart shows the pixel patterns which are classified as horizontal, along with the corresponding factors and the reference number of the accompanying figure which shows the pattern. Here, a configuration pixel is black.

| Pixel Pattern With Reference to Center Pixel | Factor | FIGURE Showing |
|---|---|---|
| pixel on upper left, pixel above, pixel on upper right, pixel on right | 0.5 | 7(A) |
| pixel on left, pixel on lower left, pixel below, pixel on lower right | 0.5 | 7(B) |
| pixel on left, pixel on upper left, pixel above, pixel on upper right | −0.5 | 7(C) |
| pixel on right, pixel on lower right, pixel below, pixel on lower left | −0.5 | 7(D) |
| pixel on lower left, pixel on left, pixel on upper left, pixel above, pixel on upper right, pixel on left | −0.5 | 7(E) |
| pixel on upper right, pixel on right, pixel on lower right, pixel below, pixel on lower left, pixel on left | −0.5 | 7(F) |
| pixel on left, pixel on upper left, pixel above, pixel on upper right, pixel on right, pixel on lower right | 0.5 | 7(G) |
| pixel on upper left, pixel on right, pixel on lower right, pixel below, pixel on lower left | 0.5 | 7(H) |
| pixel on left, pixel on upper left, pixel above, pixel on upper right, pixel on right | 0 | 7(I) |
| pixel on left, pixel on right, pixel on lower right, pixel below, pixel on lower left | 0 | 7(J) |
| pixel on lower left, pixel on left, pixel on upper left, pixel above, pixel upper right, pixel on right, pixel on lower right | 0 | 7(K) |
| pixel on lower left, pixel on left, pixel on upper left, pixel upper right, pixel on right, pixel on lower right, pixel below | 0 | 7(L) |
| pixel on upper left, pixel above, pixel on upper right, pixel on left, pixel on lower right | 1 | 7(M) |
| pixel on upper left, pixel on lower right, pixel below, pixel on lower right, pixel on left | 1 | 7(N) |
| pixel on left, pixel on upper left, pixel above, pixel on upper right, pixel on lower left | −1 | 7(O) |
| pixel on upper right, pixel on right, pixel on lower right, pixel below, pixel on lower left | −1 | 7(P) |

Where the total number of occurrences of each pattern shown in FIGS. 7(A)–7(P) which are found in the image are defined as "Na" to "Np", respectively, the inclined angle θ can be calculated by the formula below.

$$\Theta = \tan^{-1}[\{0.5(Na+Nb+Ng+Nh)-0.5(Nc+Nd+Ne+Nf)+Nm+Nn-No-Np\}/(Na+Nb+Nc+Nd+Ne+Nf+Ng+Nh+Ni+Nj+Nk+Nl+Nm+No+Np)]$$

A paper to be input which has its major direction of inclination in the vertical direction can be processed in a similar way. The vertical patterns corresponding to the patterns of FIGS. (A)–9(P) are shown in FIGS. 10(A)–10(P).

The following chart shows the vertical patterns, the corresponding factors and references to the corresponding diagrams:

| Pixel Pattern With Reference to Center Pixel | Factor | FIGURE Showing |
| --- | --- | --- |
| pixel on left, pixel on upper left, pixel above, pixel on lower left | 0.5 | 8(A) |
| pixel on upper right, pixel on right, pixel on lower right, pixel below | 0.5 | 8(B) |
| pixel on left, pixel on upper left, pixel below, pixel on lower left | −0.5 | 8(C) |
| pixel above, pixel on upper right, pixel on right, pixel on lower right | −0.5 | 8(D) |
| pixel on left, pixel on upper left, pixel above, pixel on upper right, pixel below, lower left | 0.5 | 8(E) |
| pixel above, pixel on upper right, pixel on right, pixel on lower right, pixel below, pixel on lower left | 0.5 | 8(F) |
| pixel on upper left, pixel above, pixel on upper right, pixel on right, pixel on lower right, pixel below | −0.5 | 8(G) |
| pixel on left, pixel on upper left, pixel above, pixel on lower right, pixel below, pixel on lower left | −0.5 | 8(H) |
| pixel on left, pixel on upper left, pixel above, pixel below, pixel on lower left | 0 | 8(I) |
| pixel above, pixel on upper right, pixel on right, pixel on lower right, pixel below | 0 | 8(J) |
| pixel on upper left, pixel above, pixel upper right, pixel on right, pixel on lower right, pixel below, pixel on lower left | 0 | 8(K) |
| pixel on left, pixel on upper left, pixel above, pixel on upper right, pixel on lower right, pixel below, pixel on lower left | 0 | 8(L) |
| pixel on upper left, pixel above, pixel on upper right, pixel on right, pixel on lower right | −1 | 8(M) |
| pixel on upper left, pixel on lower right, pixel below, pixel on lower right, pixel on left | −1 | 8(N) |
| pixel on left, pixel on upper left, pixel above, pixel on upper right, pixel on lower left | 1 | 8(O) |
| pixel on upper right, pixel on right, pixel on lower right, pixel below, pixel on lower left | 1 | 8(P) |

Hereinafter, the third embodiment of the method for detecting inclination of an image of a paper to be input of the present invention is described.

Figure 9B:
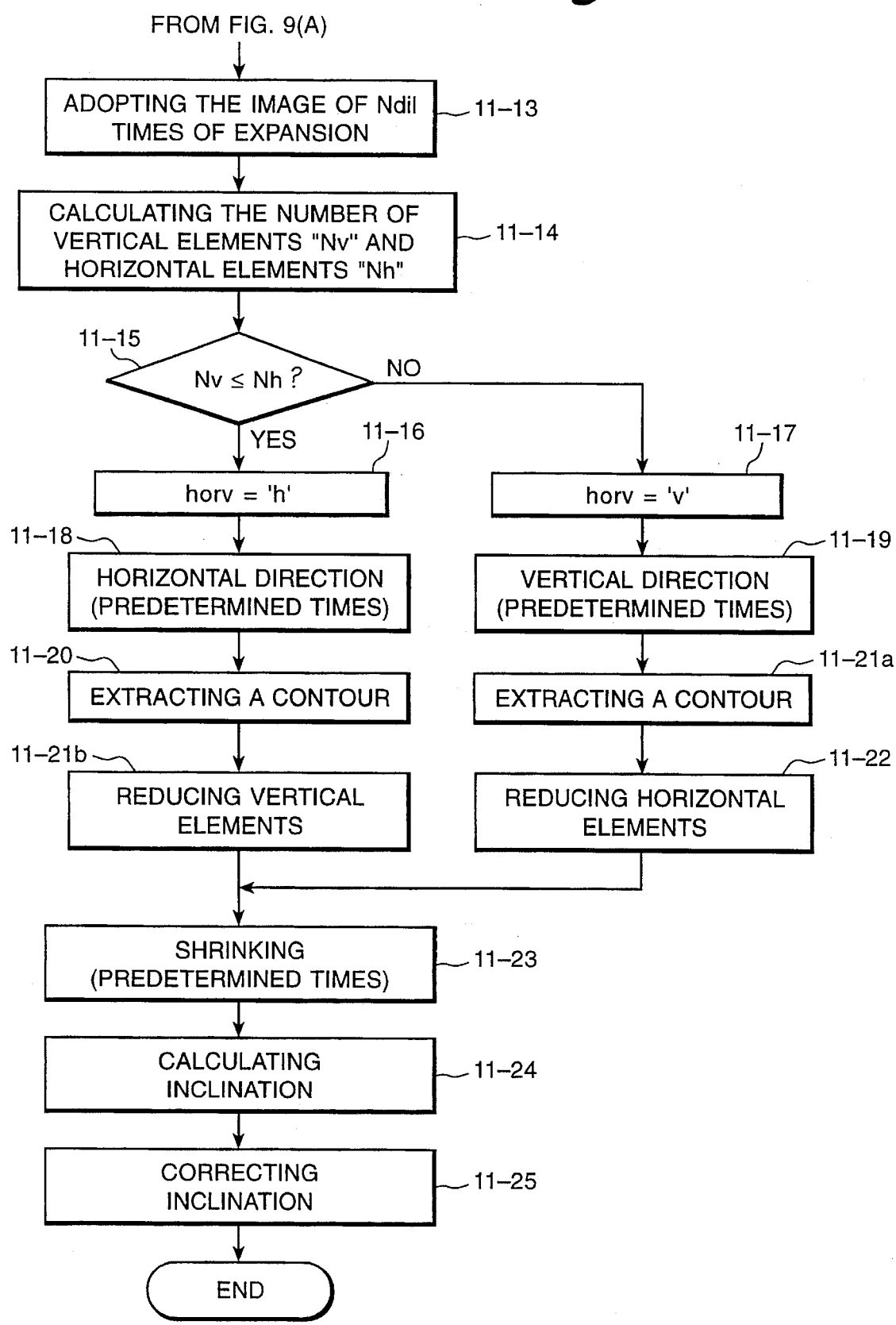

FIGS. 9(A)–9(B) show a flow-chart of an embodiment of this invention. In this embodiment, process steps from 11-1 to 11-19 are equivalent to those in FIGS. 1(A)–1(B).

In step 11-18 or 11-19, the image is expanded according to the predetermined number of times, as discussed above. Each line in the image after the optimal number of expansions is roughly a rectangle.

For example, when characters on a paper are written horizontally, the image of the paper is expanded so that almost all of the neighboring characters within the same line are merged together to form a single one line.

In the steps 11-20 or 11-26, the contour of each line in the expanded image is extracted through differentiation, subtraction of successive expanded images, or any other known process.

Then in step 11-21, the vertical element of the expanded image with the contours extracted is reduced. Only the major direction of inclination in the paper is extracted as an image by these steps, which provides for the easy calculation of the inclination.

During the foregoing process, a diagonal element is generated on both ends of each line because the image receives the reflection of the vertical element. The improper parts on both ends of each line are reduced by shrinking in step 11-23.

The number of times shrinking is performed should be the minimum. The optimal number of shrinking has been found to be $15/4 \times Ndil+1$, where Ndil is calculated as described above. When the lines are shrunk this many times a length corresponding to from 1 to 1½ characters is deleted. Noise reduction is performed on the, and inclination is calculated based on this image.

By using the method of this third embodiment, it is possible to calculate precisely and easily an inclination by generating an expanded image, by expanding the image the optimal number of times in the direction of the major direction of inclination, and by determining the inclination according to the contour of the expanded image with contours extracted. The process of thinning is thus unnecessary.

As mentioned above, by the present invention inclination of character lines is detected easily as well as precisely without labeling. The number of lines on the page that is input when using the present invention is therefore not limited by some maximum label number. The inclination correction can be performed by means of software or by special purpose ICs.

Calculation and correction of the inclination is then performed in steps 11-23 and 11-24 in the same way as described above with reference to steps 1-22 and 1-23 and to FIGS. 4(A)–5(I).

What is claimed is:

1. A method for producing a signal which is indicative of an inclination of an image of a physical object that contains information thereon, said method comprising the steps of:

(a) generating an image signal by using an electronic image generator to create said image of said physical object, wherein said information is stored in character lines, each character line containing characters therein;

(b) transforming said image signal into a first expanded image signal, which represents an expanded image of said physical object, by successively expanding said image of said physical object Ndil times in both a horizontal direction and a vertical direction, wherein Ndil is the minimum number of expansions required so as to cause said characters within said character lines to fuse with one another;

(c) determining, in accordance with the expanded image signal produced in step (b), whether said character lines are formed in a substantially vertical direction or a substantially horizontal direction;

(d) transforming, in accordance with the determination made in step (c), said image signal into a second expanded image signal, which represents a second expanded image of said physical object, by successively expanding said image of said physical object a predetermined number of times in one of a horizontal direction and a vertical direction, which depends on the determination made in step (c);

(e) determining inclination factors for predetermined zones within said second expanded image, wherein each said predetermined zone is a separate section of said second expanded image;

(f) determining, based upon said inclination factors, the inclination of said image of said physical object with reference to said determination made in step (c);

(g) transforming said second expanded image signal into an inclination signal, said inclination signal being based upon said determination made in step (f); and (h) reproducing, in a human readable format, said information contained on said physical object in accordance with said inclination signal produced in step (g), so as to produce the information in an aligned manner.

2. The method of claim 1, wherein Ndil is based upon a difference in the area of the non-background portion of two reiteratively expanded images which are produced by expanding said image in both said horizontal and vertical directions.

3. The method of claim 1, wherein Ndil is determined by performing reiterative expansion of said image in both said horizontal and vertical directions until the following formula is satisfied:

$$\Delta^2 Nw(i+1) - \Delta^2 Nw(i) < 0;$$

wherein $\Delta^2 Nw(i) = \Delta Nw(i+1) - \Delta Nw(i)$, $\Delta Nw(i) = Nw(i+1) - Nw(i)$, $Nw(i)$ is equal to the number of non-background pixels after expansion has been performed i times, and $Ndil = n(i-1)/m$, wherein n and m are positive real integer numbers.

4. The method of claim 1 further comprising, in between steps (d) and (e), the step of:

(d1) thinning said second expanded image, thereby producing a thinned image.

5. The method of claim 4 further comprising, in between steps (d1) and (e), the step of:

(d2) shrinking said thinned image.

6. The method of claim 1 further comprising, in between steps (d) and (e), the step of:

(d1) extracting contours from said character lines of said second expanded image; and wherein each said predetermined zone encompasses a section of a corresponding one of said contours.

7. The method of claim 1, wherein each said inclination factor is based upon a relative location of non-background pixels in a corresponding one of said predetermined zones with respect to the center of said corresponding predetermined zone, as said relative location compares with said determination made in step (c).

8. The method of claim 1, wherein said inclination of said image is determined according to the following formula:

$$\theta = \tan^{-1}(F/Z);$$

wherein $\theta$ is an angle corresponding to said inclination of said image, F is the sum of said inclination factors, and Z is the number of said predetermined zones.

9. The method of claim 1, wherein step (c) includes the steps of:

(b1) reiteratively expanding said image in said horizontal and vertical directions until Ndil=i−1, wherein i is determined in accordance with the following formula:

$$\Delta^2 Nw(i+1) - \Delta^2 Nw(i) < 0;$$

wherein $\Delta^2 Nw(i) = \Delta Nw(i+1) - \Delta Nw(i)$, $\Delta Nw(i) = Nw(i+1) - Nw(i)$, and $Nw(i)$ is equal to the number of non-background pixels after expansion has been performed i times; and (b2) classifying preselected zones in said expanded image produced in step (b1) as being one of a horizontal element and a vertical element; and wherein said determination of step (c) is based upon a comparison of the classification of said preselected zones made in step (b2).

10. The method of claim 9, wherein said classification is based upon a relative location of non-background pixels in each said preselected zones with respect to the center of said preselected zones.

11. The method of claim 1, wherein said electronic image generator is a copy machine.

12. The method of claim 1, wherein said electronic image generator is a facsimile machine.

13. The method of claim 1, wherein said electronic image generator is an optical character recognition system.

14. The method of claim 1, wherein said reproduction of said information in step (h) occurs on a second physical object.

15. The method of claim 14, wherein said second physical object includes a video display.

16. The method of claim 14, wherein said second physical object includes a sheet of paper.

17. A method for producing an aligned image comprising the steps of:

(a) generating an image signal by using an electronic image generator to create an image of a physical object that contains information thereon, wherein said information is stored in character lines, each character line containing characters therein;

(b) transforming said image signal into a first expanded image signal, which represents an expanded image of said physical object, by successively expanding said image of said physical object Ndil times in both a horizontal direction and a vertical direction, wherein Ndil is the minimum number of expansions required so as to cause said characters within said character lines to fuse with one another;

(c) determining, in accordance with the expanded image signal produced in step (b), whether said character lines are formed in a substantially vertical direction or a substantially horizontal direction;

(d) transforming, in accordance with the determination made in step (c), said image signal into a second expanded image signal, which represents a second expanded image of said physical object, by successively expanding said image of said physical object a predetermined number of times in one of a horizontal direction and a vertical direction;

(e) determining inclination factors for predetermined zones within said second expanded image, wherein each said predetermined zone is a separate section of said second expanded image;

(f) determining, based upon said inclination factors, the inclination of said image of said physical object with reference to said determination made in step (c); and (g) rotating, in accordance with said determination made in step (f), said image of said physical object, thereby producing said aligned image signal.

18. The method of claim 17, wherein said electronic image generator is a copy machine.

19. The method of claim 17, wherein said electronic image generator is a facsimile machine.

20. The method of claim 17, wherein said electronic image generator is an optical character recognition system.

21. The method of claim 17, further comprising the step of:

(h) producing, in a human readable format, said rotated image produced in step (g).

22. The method of claim 21, wherein said producing of said rotated image in step (h) occurs on a second physical object.

23. The method of claim 22, wherein said second physical object includes a video display.

24. The method of claim 22, wherein said second physical object includes a sheet of paper.

* * * * *